Figure 1:
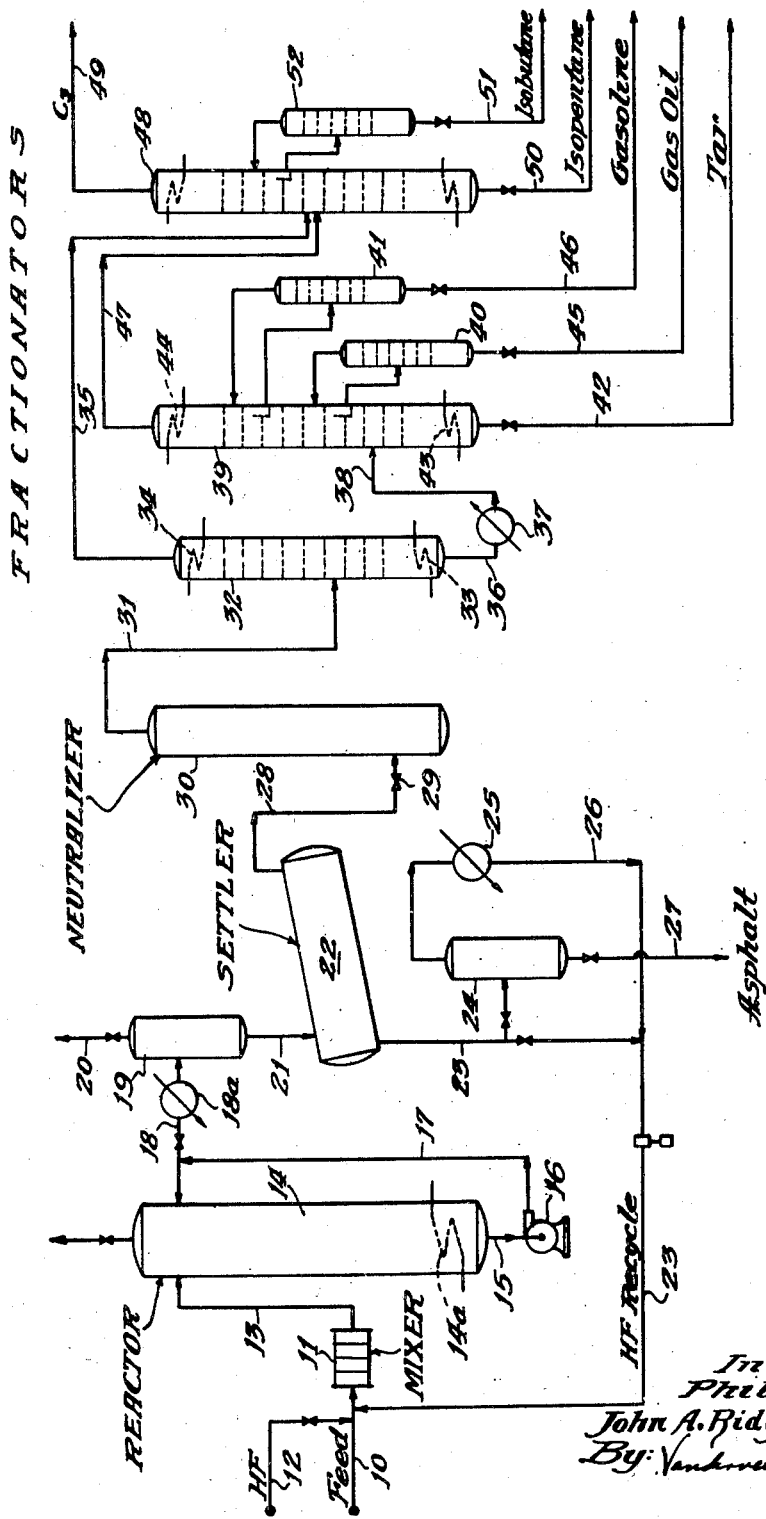

Nov. 23, 1948. J. A. RIDGWAY, JR., ET AL 2,454,615
CATALYTIC CRACKING OF HYDROCARBONS
Filed Nov. 12, 1943 2 Sheets-Sheet 1

Inventors:
Philip Hill
John A. Ridgway, Jr.
By: Vanhuser Voorhees
Attorney

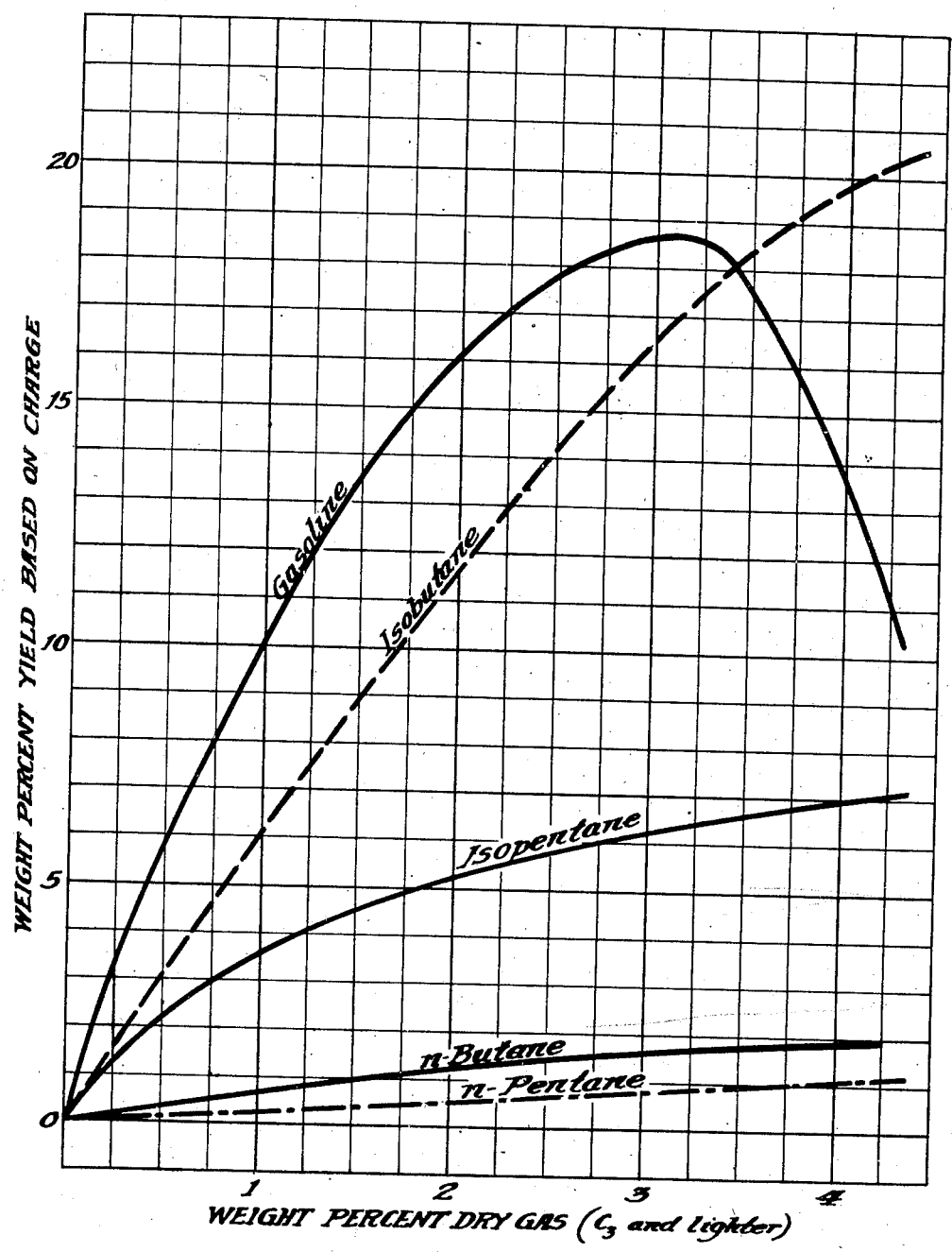

Patented Nov. 23, 1948

2,454,615

UNITED STATES PATENT OFFICE 2,454,615

CATALYTIC CRACKING OF HYDROCARBONS

John A. Ridgway, Jr., Texas City, Tex., and Philip Hill, Hammond, Ind., assignors to Pan American Refining Corporation, New York, N. Y., a corporation of Delaware Application November 12, 1943, Serial No. 509,974

12 Claims. (Cl. 196—52)

This invention relates to the cracking of hydrocarbon oils and more particularly it relates to the use of liquid hydrofluoric acid as a catalyst in cracking heavy oil and heavy naphtha. Still more particularly the invention relates to the cracking of petroleum gas oil into gasoline, gas and asphalt in the presence of liquid hydrofluoric acid. One object of the invention is to convert heavy hydrocarbons and particularly gas oil into gasoline, gas and asphalt in the presence of a catalyst, substantially without the formation of carbon or carbonaceous compounds of such a character as to absorb or destroy the catalyst. Another object of the invention is to provide a process for cracking heavy hydrocarbon oils which will produce a minimum amount of dry gas and a maximum amount of condensable hydrocarbon gases of isoparaffinic structure. Still another object of the invention is to provide a hydrocarbon cracking process which selectively converts a major part of the oil to gasoline and asphalt or heavy fuel oil of high heating value with a minor production of "fixed" gases. Other objects of the invention will become apparent from the description which follows.

The invention is illustrated by a drawing which shows diagrammatically in Figure 1 an apparatus for carrying out the process. Figure 2 is a graph of data obtained in the process.

Heretofore the catalytic cracking of heavy oils has been beset by the great difficulty of catalyst deterioration, some processes requiring high catalyst replacement and others requiring frequent catalyst regeneration at considerable expense. In the case of a catalyst such as aluminum chloride employed in the well-known McAfee process, the aluminum chloride suffered rapid contamination resulting in extensive aluminum chloride losses owing to catalyst degeneration. The cause of degeneration is generally traceable to the interaction of the heavy hydrocarbons and their breakdown products with the aluminum chloride, forming more or less stable addition products or a sludge of no catalytic value. Many attempts have been made to regenerate the aluminum chloride but without much commercial success.

In the case of high temperature catalytic cracking processes employing refractory porous catalysts such as the active metal oxides, silica, alumina, magnesia, titania, zirconia and mixtures thereof, catalyst deactivation is very rapid and regeneration is required frequently, e. g. after a period of a few minutes to a few hours. This regeneration is usually accomplished in the case of the refractory metal oxide catalysts by combustion with air or other oxidizing gas. In the regeneration operation, considerable quantities of carbonaceous matter accumulated on the catalyst by breakdown of the oil are removed in the oxidation.

We have now found that when substantially anhydrous liquid hydrofluoric acid is employed as a cracking catalyst in substantial amounts, the conversion may be carried out with substantially no carbon formation but with the formation of a great deal of asphalt, tar, or heavy fuel, i. e. high boiling conversion products. On distillation of the conversion residue, we have found that the hydrofluoric acid catalyst, having formed no permanent compounds therewith, may be recovered substantially completely for re-use in the process. We have further found that the heavy conversion products produced by the action of this catalyst are valuable fuel oils after removal of HF therefrom. One of their characteristics is the high heat of combustion coupled with low specific gravity, making them very suitable for fuel purposes. The following examples illustrate the conversion of gas oil with liquid HF catalyst. Virgin gas oil and recycle gas oil for hydrofluoric acid cracking were employed with the following characteristics:

| | Virgin Gas Oil | Recycle Gas Oil |
|---|---|---|
| Specific Gravity | 0.83 | 0.81 |
| Aniline Point, ° F | 170 | 179 |
| Distillation—ASTM—° F.: | | |
| 10% | 454 | 462 |
| 30% | 482 | 505 |
| 50% | 515 | 533 |
| 70% | 537 | 560 |
| 90% | 575 | 606 |
| Volumetric Average Boiling Point, ° F | 513 | 534 |

The reaction was carried out in a bomb under the conditions set forth as follows:

|  | Run #1 | Run #2 | Run #3 |
|---|---|---|---|
| Charge | Virgin Gas Oil C. U. #1 | | Recycle Gas Oil |
| Per cent Cat. by Wt | 295 | 193 | 191 |
| Per cent Cat. by Vol | 234 | 158 | 158 |
| Per cent Cat. by Mols | 3,200 | 2,160 | 2,290 |
| Time, hours | 4 | 4 | 4 |
| Temperature, °C | 155-165 | 155-162 | 155-161 |
| Max. pressure, lbs./sq. in | 910 | 840 | about 850 |

*Product—Wt. Per Cent of Charge*

| Gas: | | | |
|---|---|---|---|
| $C_1$ | 0.22 | 0.08 | 0.49 |
| $C_2$ | ---- | ---- | 0.46 |
| $C_3$ | 4.05 | 2.47 | 3.39 |
| $iC_4$ | 20.3 | 14.20 | 10.88 |
| $nC_4$ | 2.13 | 1.11 | 1.23 |
| $iC_5$ | 7.27 | 6.20 | 5.10 |
| $nC_5$ | 1.16 | 0.60 | 1.52 |
| Total Gas | 35.1 | 24.6 | 23.1 |
| Liquid Distillate: | | | |
| $C_6$–100° C | 6.0 | 3.9 | |
| 100–200° C | 4.7 | 8.7 | 39.9 |
| 200+ ° C | 9.0 | 20.7 | |
| Total Gasoline | 10.7 | 12.6 | ---- |
| Total Recycle Stock | 9.0 | 20.7 | ---- |
| Total Reacting | 91.0 | 79.3 | ---- |
| Tar | 45.2 | 42.1 | 37.0 |
| Yield Date (Based on amount reacting): | | | |
| Total gas ($C_3$, $C_4$, $C_5$ and lighter), per cent | 38.6 | 31.0 | ---- |
| Gasoline ($C_6$–200° C.), per cent | 11.7 | 15.9 | ---- |
| Gas+gasoline, per cent | 50.3 | 46.9 | ---- |
| Tar, per cent | 49.7 | 53.1 | ---- |

These data show that the proportion of catalyst employed in the conversion is of considerable importance in determining the extent of conversion obtained. Thus the total amount of conversion (total reacting) in run 1 with 295% of HF was 91 compared with only 79.3 in run 2 in which all the conditions were the same except the proportion of catalyst was 193% by weight instead of 295. In general, it is desirable to employ an amount of catalyst equal to at least half the weight of the oil treated, and a catalyst-oil ratio in the range of 1:1 to 3:1 is desirable.

Inspection of the above results also shows that the increased proportion of catalyst employed in run 1 favors the production of isobutane, a valuable product useful in alkylation and other reactions. Although the recovery of tar in run 1 appears to be slightly larger than in run 2, this increase is only apparent. When correction is made for the increased conversion in run 1 (91.0 v. 79.3) the tar yield will be seen to be less with increased proportion of catalyst to oil. (Note yield based on percent reacting 49.7 v. 53.1.) The temperature employed with liquid HF cracking catalyst is unusually low for catalytic conversion reactions, the range in temperature usually being about 100 to 230° C. and preferably about 140 to 175° C.

The reaction time may be varied over a considerable range depending primarily on the temperature and the ratio of catalyst-to-oil treated. Thus in an example in which 193% of HF was used to convert virgin gas oil, the total gas yield obtained from virgin gas oil at 135 to 145° C. was only 2.4% at a reaction time of 2 hours and 7% at 5 hours reaction time. However, in another example with the same catalyst concentration but with a conversion temperature of 155 to 160° C. an increase in reaction time of from 1½ to 4 hours increased the gas yield from 2.4 to 24.6 percent. In general it appears that a conversion temperature of 150° C. or above is necessary for appreciable gas production within a period of four hours or less.

The apparent low yield of "gasoline" must be corrected by adding thereto the $C_5$ and most of the $C_4$ hydrocarbons when comparing with the usual conversion data on gasoline of 9 to 12 pounds Reid vapor pressure. On this basis the gasoline yield in run 2 would be about 44% based on amount reacting.

Referring to Figure 1 of the drawing, a suitable feed stock, for example a virgin gas oil of 35° A. P. I. gravity having a boiling range of about 345° to 650° F. is charged to the system by line 10 leading to mixer 11. Any suitable mixing device may be used such as an orifice mixer consisting of a series of orifice plates thru which the feed stock is forced to flow at high velocity. Liquid HF is charged to the system by line 12 and mixed with the hydrocarbon feed in mixer 11. The mixture then flows by line 13 to reaction chamber 14. The volume of the reaction chamber is sufficient to provide the desired reaction time, for example ten minutes to four hours depending on the temperature, character of the feed stock, etc. For short reaction times, a coil reactor may be used. The amount of HF employed in the reaction is sufficient to maintain a separate liquid catalyst phase and it is desirable to employ a considerable excess above that required to saturate the hydrocarbons.

The temperature of the reaction zone 14 is maintained above 100° C. and generally within the range of 125 to 200° C., a suitable temperature being about 150 to 160° C. Higher temperatures may be employed for short reaction periods. Any suitable heating means may be employed for the purpose, for example coil 14a supplied with heated oil, steam or other heating fluid. We can also preheat the HF and feed in separate heaters, not shown, previous to mixing in mixer 11.

The mixture of hydrocarbon stock and HF in reactor 14 is maintained in a highly agitated condition in order to obtain the necessary contact between the two liquid phases to effect catalytic conversion. Mechanical agitators may be installed directly in the reaction chamber or the agitation may be provided both internally and externally of the reaction chamber as shown in the drawing. According to this method the reaction mixture is withdrawn by line 15 from the bottom of chamber 14 and conducted by centrifugal pump 16 thru line 17 back to the top of the reaction chamber. By maintaining a high recycle ratio, any desired degree of interspersion of the liquid catalyst phase and the oil phase may be obtained.

A controlled stream of reaction products is withdrawn by valved line 18 leading thru cooler 18a to gas separator 19 from which some of the lighter gaseous reaction products can be withdrawn by line 20. Liquid reaction products are conducted by line 21 to catalyst settler and separator 22. Settler 22 is preferably a horizontal, cylindrical, elongated chamber thru which the reaction products flow continuously without agitation, thereby allowing the heavy liquid HF and associated asphalt to separate at the bottom of the settler 22. This catalyst layer containing some heavy hydrocarbons in solution can be conducted directly by line 23 back to the feed mixer 11 wherein it is mixed with fresh amounts of hydrocarbon feed stock and returned to the reactor 14. Or a part or all of the stream may be diverted thru asphalt separator 24 wherein HF is distilled from the asphalt, the HF being condensed in condenser 25 and recycled by line 26 while asphalt is withdrawn by line 27.

The hydrocarbon reaction products are withdrawn from settler 22 by line 28 and valve 29, thence to neutralizer 30 wherein traces of HF dissolved in the hydrocarbon stream are removed by an alkaline neutralizing agent such as sodium carbonate, sodium hydroxide, lime, etc., either solid or in solution, or by adsorption with a suitable adsorbent for HF such as fuller's earth, silica gel, bauxite, or one of the acid-absorbing nitrogen-base resins employed in water treating. In the case of certain stocks and types of operation where the amount of HF dissolved in the products withdrawn from the upper part of settler 22 is appreciable, we may recover the HF, for example, by stripping in place of neutralizing. In this case neutralizer 30 may be substituted or preceded by a stripping column and the recovered HF vapor may be recycled to the mixer 11.

From neutralizer 30 reaction products pass by line 31 to fractionator 32. Heat is supplied to the fractionator by reboiler coil 33 and reflux by cooling coil 34. Light products including butanes and lighter hydrocarbons are distilled off thru line 35 leading to fractionator 48.

The principal liquid hydrocarbon products are withdrawn from the bottom of fractionator 32 by line 36 and heated in heater 37, which may be a pipe still for example. From heater 37 the liquid products are conducted by line 38 to fractionator 39 provided with gas oil and gasoline side strippers 40 and 41 respectively. A heavy fraction suitable for fuel oil or asphalt manufacture is withdrawn at the bottom by line 42. Heat required for reboiling in fractionator 39 is supplied by coil 43 while reflux cooling is supplied by coil 44. The gas oil fraction withdrawn by line 45, if desired, may be conducted back to mixer 11 as feed stock for the process. The gasoline withdrawn by line 46 is essentially a heavy blending naphtha.

Pentane and lighter hydrocarbons are withdrawn from fractionator 39 by vapor line 47 leading to fractionator 48 to which vapors from fractionator 32 may also be conducted. Propane and lighter products are discharged by vapor line 49 while pentane is removed as the bottom stock by line 50 and butane is withdrawn by line 51 from side stripper 52. The pentane and butane streams produced in the process consist largely of isopentane and isobutane. The isopentane is chiefly valuable for blending in aviation fuels and other high knock rating gasoline. Both isopentane and isobutane may be subjected to alkylation with suitable olefins, for example ethylene, propylene or butylene, to produce alkylate gasoline, neohexane, isooctane, triptane, etc., very desirable constituents of aviation fuels.

In the cracking of virgin gas oil, gas production has been found to decrease with increasing reaction pressure. When the reaction pressure is increased from 1290 to 2100 pounds per square inch gauge, a sharp decrease in total gas yield and tar formation are noted with increased production of recycle stock, while the gasoline yield remains essentially constant. Data on the yields of gas, gasoline and tar compared with percent of stock cracked show that the rate of tar production increases regularly with the extent of cracking while the gasoline reaches a maximum with conditions producing a total conversion of about 65 percent. In Figure 2 are plotted data showing an accelerated production of the isoparaffin gases with isobutane exceeding "gasoline" production at about 19 percent.

As indicated hereinabove one of the important advantages of this process of hydrocarbon conversion over other catalytic processes lies in the substantially complete recovery of catalyst without necessity of regeneration. Most of the catalyst separates as a separate liquid layer while the remainder is removed by simply stripping or distilling the catalyst from the reaction products. Substantially no undecomposable sludge or catalyst is formed in the reaction and therefore very little fresh catalyst need be added by way of replacement beyond that necessary to compensate for mechanical losses.

Hydrogen may also be employed in the HF conversion reaction to modify the character and amount of tar or asphalt formed. The amount employed can be in the range of 1000 to 3000 cubic feet per barrel of oil treated. Hydrogen pressures of 500 to 3000 pounds per square inch are suitable. Hydrocarbon gases containing hydrogen may be used instead of hydrogen and hydrogen-containing gases produced in the process may thus be employed. In the HF catalytic cracking process the gas produced consists chiefly of butanes and pentanes and in most cases these fractions contain about 88 to 93% of isoparaffins. No neopentane has been detected. The butane yields are especially high; for example 22.4% from virgin gas oil and 28.7% from dodecene was obtained. The heavier charging stocks tends to produce less dry gas, that is, propane and lighter hydrocarbons and hydrogen, than the lighter charging stocks. All gas is completely saturated. If desired, the $C_4$ and $C_5$ fractions may be allowed to remain with the "gasoline" instead of being separated as shown hereinabove. It is generally preferred to operate the process with sufficient cracking to yield products having a 90% point—ASTM—below the 10% point of the charging stock.

The concentration of isobutane and isopentane is much higher than would be expected from the equilibrium values calculated from thermodynamic data, which may indicate that isomerization occurs prior to or simultaneously with the cracking reaction in the presence of HF. For comparison, the concentration of isobutane in the catalytic isomerization of butane is only about 65%.

The "gasoline" obtained in the process is substantially free of unsaturation and a cut from hexane to 200° C. had a knock rating of 57 by the ASTM method which was determined in a 20% blend with reference fuel. Inclusion of isobutane and isopentane produced in the process would of course increase the knock rating very considerably, and it is estimated that a gasoline fraction containing sufficient of the lighter hydrocarbons to give a vapor pressure of 10 pounds R. V. P. will have a knock rating of 67.5, ASTM. However, because of the high concentration of isopentane (about 90%) in the $C_5$ fraction, it is usually more desirable to use this stock in aviation fuel blending where isopentane commands a high premium.

The tar produced in the process is characterized by high specific gravity, for example about 1. It can be employed as a heavy fuel or converted into asphalt by heating and/or blowing with air.

Although we have described our process as it is applied to the conversion of gas oil, it may also be applied to low knock rating heavy naphthas boiling, for example, in the range of 325° to 450° F., where it is desired to obtain $C_4$ and $C_5$ hydrocarbons for special purposes.

We claim:

1. The process of cracking hydrocarbon oils heavier than gasoline to form gas and gasoline components including low boiling isoparaffinic hydrocarbons while simultaneously forming tar, which comprises subjecting said oils to the action of a catalyst consisting of hydrofluoric acid in an amount at least equal to the weight of oil treated, maintaining the temperature of the reaction zone within the range of about 100 to 250° C., maintaining sufficient pressure in the reaction zone to keep the catalyst in liquid phase, maintaining the hydrofluoric acid in intimate contact with said oils in said reaction zone for a time of contact sufficient to effect cracking as the predominant reaction, removing the hydrocarbon products from the reaction zone, removing dissolved catalyst therefrom by distillation and returning it to the reaction zone and recovering isobutane, isopentane and other hydrocarbons of the gasoline boiling range from the hydrocarbon products.

2. The process of claim 1 wherein a gas oil fraction is separated from the products and recycled to the reaction zone for further cracking.

3. The process of cracking heavy hydrocarbon oil boiling above the gasoline boiling range to produce isoparaffinic hydrocarbons, which comprises contacting said oil with at least 50% by weight of a catalyst consisting on anhydrous liquid hydrofluoric acid at a temperature in the range of about 100 to 250° C., introducing hydrogen into the reaction zone in an amount of about 1000 to 3000 cubic feet per barrel of heavy oil treated, maintaining sufficient pressure on said reaction zone to keep the catalyst in the liquid phase, continuing the reaction until said heavy hydrocarbon oil is substantially converted into hydrocarbons boiling in the gasoline boiling range, recovering catalyst from the reaction products and returning it to said reaction zone, and separating from the reaction products tar, gasoline boiling range hydrocarbons and hydrocarbon gas.

4. A process for the production of isoparaffinic hydrocarbons which comprises contacting a normally liquid petroleum hydrocarbon charging stock oil with a catalyst consisting of hydrogen fluoride in a reaction zone, said hydrogen fluoride being present in said reaction zone in such quantities under reaction conditions as to give a two-liquid phase system, maintaining intimate contact between the two liquids in said liquid phases at about 100 to 230° C. for a period of time sufficient to give cracking as the predominant reaction whereby lower boiling products including isoparaffins are produced, and recovering by distillation an isoparaffin-rich hydrocarbon product having a 90% point in the ASTM distillation below the 10% point of the said hydrocarbon charging stock.

5. A process for the production of isoparaffinic hydrocarbons which comprises contacting a hydrocarbon oil fraction in a reaction zone with at least 50% by weight of a catalyst consisting of hydrogen fluoride in said reaction zone and under sufficient pressure to produce two liquid phases under reaction conditions, agitating said liquid phases at about 100 to 300° C., separating said catalyst from the reaction products, recovering from said reaction products a product comprising isoparaffinic hydrocarbons, said product having a boiling range substantially below that of said charging stock and returning a substantial portion of said catalyst to said reaction zone.

6. The process of claim 4 wherein the temperature of the reaction lies within the range of about 140 to 200° C.

7. The process of cracking heavy hydrocarbon oils into lower boiling isoparaffinic hydrocarbons, which comprises subjecting said oils at a temperature of about 100 to 250° C. to the action of at least 50% by weight of a catalyst consisting of liquid hydrofluoric acid, injecting sufficient hydrogen into the reaction mixture to maintain the pressure in the range of about 500 to 3000 pounds per square inch, maintaining intimate contact between the liquid hydrofluoric acid and the oil by agitating the reaction mixture for a period of time until said oil has been substantially converted to lower boiling isoparaffinic hydrocarbon products, separating said lower boiling products from hydrogen and hydrofluoric acid and recycling said hydrogen and hydrofluoric acid to said contacting step.

8. The process of cracking gas oil which comprises subjecting said oil in a reaction zone to the action of a catalyst consisting of liquid hydrofluoric acid in an amount of about one to three parts of catalyst by weight to each part of oil treated, maintaining an intimate admixture of said catalyst and oil in said reaction zone under sufficient pressure to maintain the said catalyst in liquid phase, maintaining the temperature of said reaction zone within the range of about 100 to 300° C., employing a time of contact in said reaction zone sufficient to effect cracking as the predominant reaction, withdrawing the reaction products from said reaction zone and recovering gasoline boiling range hydrocarbons, gas and tar therefrom.

9. The process of cracking heavy hydrocarbon oils which comprises subjecting them at elevated temperature to the action of at least 50% by weight of a catalyst consisting of liquid HF under superatmospheric pressure, maintaining sufficient pressure to keep the HF in liquid phase, employing a temperature above 100° C. and time of treating to effect cracking of said heavy oils to lighter hydrocarbon products as the predominant reaction, separating the HF from the reaction products by settling, recycling the separated HF to the cracking operation and separating from the hydrocarbon products gas, gasoline boiling range hydrocarbons and at least one heavier fraction comprising tar.

10. The process of cracking a heavy hydrocarbon oil boiling above the gasoline boiling range which comprises contacting said oil with at least 50 per cent by weight of a catalyst consisting of hydrofluoric acid catalyst at a temperature in the range of about 125 to 200° C., maintaining sufficient pressure in the reaction zone to keep the catalyst substantially in liquid phase, maintaining said oil and catalyst in intimate contact with each other for a time of contact sufficient to effect cracking as the predominant reaction, separating said catalyst from reaction products, recovering from said reaction products a product comprising isoparaffinic hydrocarbons, said product having a boiling range substantially below that of said charging stock and returning a substantial portion of said catalyst to said reaction zone.

11. The process of cracking a heavier-than-gasoline hydrocarbon oil which comprises subjecting said oil to the catalytic action of at least 50 percent by weight of a catalyst consisting of hydrogen fluoride under reaction conditions to give a two-liquid phase system, intimately contacting said liquid phases at a temperature of about 125 to 200° C. under a pressure sufficient to effect cracking as the predominant reaction whereby a substantial portion of said oil is converted into low-boiling isoparaffin hydrocarbons and separating from products of said reaction a gas fraction, a fraction boiling in the gasoline boiling range and at least one heavier-than-gasoline fraction which includes tar.

12. The process of cracking a heavier-than-gasoline hydrocarbon oil which comprises intimately contacting said oil at a temperature in the range of 125 to 300° C. with at least 50 percent by weight of a catalyst consisting of liquid hydrogen fluoride under a pressure sufficient to maintain liquid phase conditions and for a period of time sufficient to effect cracking as the predominant reaction whereby a substantial proportion of the oil is converted into reaction products including low-boiling isoparaffin hydrocarbons, separating hydrogen fluoride from at least a part of said reaction products and recovering gasoline boiling range hydrocarbons as a principal product from that part of the reaction products.

JOHN A. RIDGWAY, JR.
PHILIP HILL.

REFERENCES CITED

The following references are of record in the file of this patent:

UNITED STATES PATENTS

| Number | Name | Date |
|---|---|---|
| 2,172,146 | Ruthruff | Sept. 5, 1939 |
| 2,265,870 | Schuit | Dec. 9, 1941 |
| 2,266,012 | d'Ouville et al. | Dec. 16, 1941 |
| 2,267,730 | Grosse et al. | Dec. 30, 1941 |
| 2,318,226 | Ipatieff et al. I | May 4, 1943 |
| 2,325,122 | Ipatieff et al. II | July 27, 1943 |
| 2,347,317 | Gibson | Apr. 25, 1944 |
| 2,357,495 | Bloch et al. | Sept. 5, 1944 |